(12) United States Patent
Fukasawa et al.

(10) Patent No.: US 6,825,958 B1
(45) Date of Patent: *Nov. 30, 2004

(54) DEVICE AND METHOD OF FABRICATING COLOR CONVERSION TABLE AND MEDIUM RECORDING PROGRAM FOR FORMING COLOR CONVERSION TABLE

(75) Inventors: Kenji Fukasawa, Nagano (JP); Hirokazu Kasahara, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 995 days.

(21) Appl. No.: 08/954,826

(22) Filed: Oct. 21, 1997

(30) Foreign Application Priority Data

Oct. 24, 1996 (JP) ............................................. 8-282726

(51) Int. Cl.[7] ................................................. G03F 3/08
(52) U.S. Cl. ........................ 358/523; 358/518; 382/167
(58) Field of Search ................................ 358/518, 519, 358/523, 525, 501, 524, 1.6, 1.9; 382/162, 167, 276; 395/109

(56) References Cited

U.S. PATENT DOCUMENTS

| | | | | |
|---|---|---|---|---|
| 4,926,254 A | * | 5/1990 | Nakatsuka et al. | 358/527 |
| 4,959,711 A | * | 9/1990 | Hung et al. | 358/523 |
| 5,491,568 A | * | 2/1996 | Wan | 358/518 |
| 5,504,821 A | * | 4/1996 | Kanamori et al. | 382/167 |
| 5,596,510 A | * | 1/1997 | Boenke | 358/523 |
| 5,610,732 A | * | 3/1997 | Komatsu | 358/525 |
| 5,659,406 A | * | 8/1997 | Imao et al. | 358/518 |
| 5,664,072 A | * | 9/1997 | Ueda et al. | 358/1.9 |
| 5,760,913 A | * | 6/1998 | Falk | 358/298 |
| 5,764,387 A | * | 6/1998 | Yamada | 358/525 |
| 5,764,795 A | * | 6/1998 | Takeo et al. | 382/167 |
| 5,768,410 A | * | 6/1998 | Ohta et al. | 382/162 |
| 5,809,181 A | * | 9/1998 | Metcalfe | 382/276 |
| 5,809,213 A | * | 9/1998 | Bhattacharjya | 358/1.6 |

* cited by examiner

*Primary Examiner*—Edward Coles
*Assistant Examiner*—Joseph R. Pokrzywa
(74) *Attorney, Agent, or Firm*—Sughrue Mion, PLLC

(57) ABSTRACT

In order to optimize a color conversion table in accordance with environment of a user since a conventional color conversion table used in a printer driver is not optimized in accordance with the environment of the user, when an installer operation is executed by a computer 21 constituting an image processing device 20, a color conversion table 21$b2b$ is formed from a pre conversion color conversion table 21$b2c$ at step S130 and according to a processing of increasing lattice points in this case, the lattice points are increased by nonlinear interpolation calculation using Lagrange interpolation equation at step S430 or the lattice points are increased by linear interpolation, and in that case the number of the lattice points may be fixed or may be a number in accordance with environment or input image by which the color conversion table 21$b2b$ having a pertinent size can be formed from the pre conversion color conversion table 21$b2c$ having a small size.

18 Claims, 14 Drawing Sheets

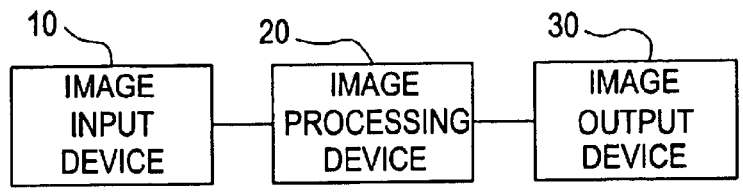
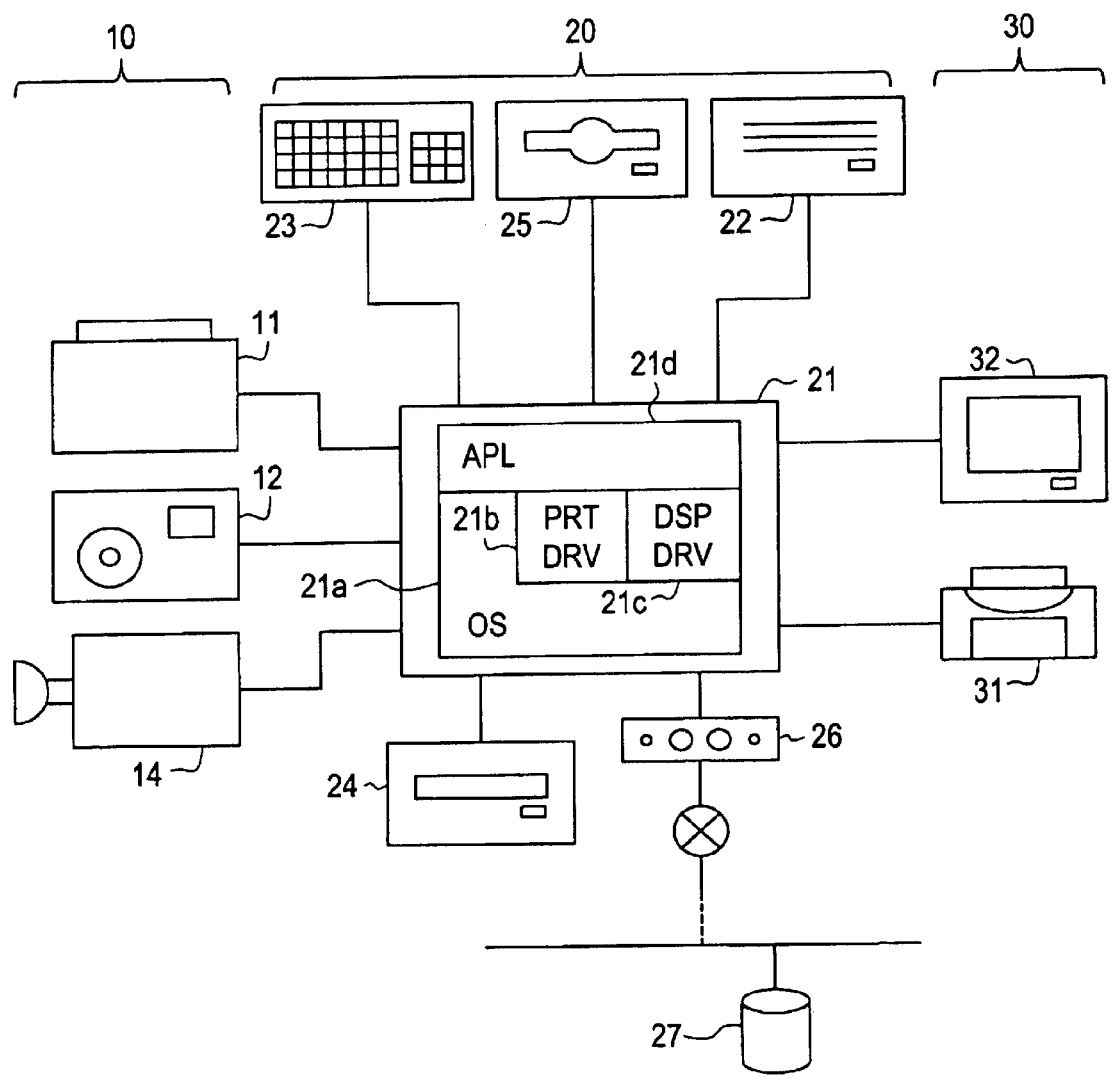

Cx ( Rx, Gx, Bx )
Mx ( Rx, Gx, Bx )
Yx ( Rx, Gx, Bx )

```
1   double lagrange(double t)
2   {
3       int i,j;
4       double sum,prod;
5
6       sum=0;
7       for (i=0;i<N;i++) {
8           prod=y[i];
9           for (j=0;j<N;j++)
10              if (j!=i) prod *=(t-x[j])/(x[i]-x[j]);
11          sum +=prod;
12      }
13      return sum;
14  }
```

FIG. 13

```
1  void maketable(double x[ ], double y[ ], double z[ ])
2  {
3      int i;
4      double t;
5      static double h[N], d[N];
6
7      z[0]=0; z[N-1]=0;      /* y N(x)/6 */ on both sides
8      for (i=0; i < N-1; i++) {
9          h[i  ]=x[i+1]-n[i];
10         d[i+1]=(y[i+1]-y[i])/h[i];
11     }
12     z[1]=d[2]-d[i]-h[0] * z[0];
13     d[1]=2 * (n[2]-x[0]);
14     for(i=1; i < N-2;i++) {
15         t=h[i]/d[i];
16         z[i+1]=d[i+2]-d[i+1]-z[i] * t;
17         d[i+1]=2 * (x[i+2]-x[i])-h[i] * t;
18     }
19     z[N-2]=h[N-2] * z[N-1];
20     for(i=N-2;i > 0;i--)
21         z[i]=(z[i]-h[i] * z[i+1])/d[i];
22 }
23
24 double spline(double t, double x[ ], double y[ ], double z[ ])
25 {
26     int i, j, k;
27     double d, h;
28
29     i=0; j=N-1;
30     while (i < j) {
31         k=(i+j)/2;
32         if(x[k] < t) i=k+1; else j=k;
33     }
34     if(i > 0) i--;
35     h=x[i+1]-x[i]; d=t-x[i];
36     return ((z[i+1]-z[i]) * d/h=z[i] * 3) * d
37         +((y[i+1]-y[i])/h
38         -(z[i] * 2 * z[i+1] * h)) * d+y[i];
39 }
```

DEVICE AND METHOD OF FABRICATING COLOR CONVERSION TABLE AND MEDIUM RECORDING PROGRAM FOR FORMING COLOR CONVERSION TABLE

BACKGROUND OF THE INVENTION

1. Field of the Invention

The present invention relates to a device and a method of fabricating a color conversion table, and a medium for recording a program for forming a color conversion table. In the invention grey scale color representing data, in a post-conversion color representing space, is corresponded to lattice points in a pre-conversion color representing space for converting grey scale color representing data between different color representing spaces.

2. Description of the Prior Art

There has conventionally been known as a color conversion table of this kind a color print system for performing color printing of a color image in a computer.

Inside the computer, the color image is displayed in a grey scale by the three primary colors of red, green and blue (R, G, B) for respective pixels arranged vertically and horizontally. In a general color printing device, printing is performed using the three colors of cyan, magenta and yellow (C, M, Y), or the four colors of (C, M, Y, K) added with black but with no grey scale. Accordingly, in performing color printing, there is an operation of color conversion from the three primary colors of red, green and blue (R, G, B) to the three colors of cyan, magenta and yellow (C, M, Y), and also an operation of grey scale conversion from grey scale display to display having no grey scale. Incidentally, although color space per se is one space, display has to differ depending on the definition of coordinates and accordingly, in the following, the space is referred to as a color representing space in accordance with the definition of coordinates, for convenience of explanation.

The color conversion from (R, G, B) display to (C, M, Y) display is not unequivocally determined by a conversion equation. Normally, a correspondence relationship is established, mutually, in respect of color spaces each having coordinates of respective grey scales. For convenience, the correspondence relationship may also be referred to as a corresponding relationship. The conversion is successively performed through this correspondence relationship. When a pre conversion (R, G, B) display is provided with 256 grey scales for each color, a color conversion table having elements of substantially 16,700,000 (256×256×256) must therefore be prepared.

For the sake of the efficient use of storage resources, the correspondence relationship is not prepared for all the coordinate values but, rather, for lattice points at pertinent discontinuous intervals. A interpolation calculation is thus used along therewith. That is, when it is intended to establish the correspondence relationship of a (C, M, Y) color representing space in respect of color of certain known coordinates in a (R, G, B) color representing space (i.e., RGB coordinates), a correspondence relationship among the lattice points surrounding the known coordinates is used. The correspondence relationship of the RGB and CMY coordinates is established after performing of linear interpolation or the like. The lattice points in each color space and their correspondence is stored as a color conversion table.

Such a color conversion table is generally provided along with a printer driver. Just one printer driver per se, including a color conversion table, is typically provided with a given color printing device. Therefore, a number of lattice points, determined based on storage constraints, is specified also in respect of the color conversion table.

The above-described conventional color conversion table, however, is not necessarily optimal with respect to a given user's environment. The color conversion table is formed by the provider the printer driver based on general storage constraints, but there may be a case where a table is too large or, sometimes a case where a larger size would be more suitable for the table, depending on the user's environment.

Furthermore, print quality may differ depending on the size of the color conversion table and, therefore, a constant size for the color conversion table may not be sufficient.

SUMMARY OF THE INVENTION

Accordingly, it is an object of the present invention to provide a device and a method for fabricating a color conversion table, capable of forming a color conversion table optimized to a given environment, such as that of a user or the like. It is also an object of the invention to provide a computer readable medium recording such a program for forming such an optimal color conversion table.

According to an aspect of the present invention, there is provided a device for fabricating a color conversion table in which a color conversion table corresponding grey scale color representing data in a post conversion color representing space to lattice points is formed in order to convert the grey scale color representing data between the different color representing spaces, the device including a pre conversion color conversion table for storing a corresponding relationship of conversion at a small number of lattice points and interpolating means for increasing the lattice points of the pre conversion color conversion table by an interpolation calculation and forming a color conversion table used in the conversion.

According to the present invention constituted as described-above, there is originally existed the pre conversion color conversion table having a small number of the lattice points, which requires little storage resource. Further, the interpolating means forms the color conversion table by increasing the lattice points of the pre conversion color conversion table by interpolation calculation and utilizes the formed color conversion table in color conversion.

The number of the lattice points in the pre conversion color conversion table may be relatively small in comparison with those in the formed color conversion table and has not necessarily to be an extremely small numerical value. Particularly, in the case of three-dimensional lattice points, the amount of lattice points is changed in a cubic ratio. That is, when the number of points is halved, the size of the color conversion table is reduced to ⅛ of the original and accordingly, enormous effect is achieved to storage resource only with a small difference therebetween.

Therefore, according to the present invention, the color conversion table is formed from the pre conversion color conversion table having a small size by increasing the lattice points and therefore, only minimum storage resource is needed when the color conversion is not performed whereas when the color conversion is performed, the color conversion table having a necessary magnitude can be formed and accordingly, the present invention can provide a further flexible device of fabricating a color conversion table. Naturally, the table may be spread when it is necessary and is not spread when it is not necessary or may be left in the spread state when there is allowance in storage resource.

In respect of the interpolation calculating means, various calculations are applicable. Hence, it is a further object of the present invention to provide a further specific constitution in respect of the interpolation calculating means.

According to a device of fabricating a color conversion table of the present invention, the interpolating means comprises nonlinear interpolation calculating means for performing an interpolation by a nonlinear interpolation calculation from a corresponding relationship of a plurality of lattice points.

According to the present invention constituted as described-above, the nonlinear interpolation calculating means of the interpolating means interpolates the lattice points by the nonlinear interpolation calculation from the corresponding relationship in the plurality of lattice points.

The corresponding relationship in the increased lattice points is accurately reproduced by performing the nonlinear interpolation calculation. Accordingly, a result having very excellent reproducing performance can be provided even with a small number of lattice points in the pre conversion color conversion table.

That is, according to the present invention, the lattice points are increased by the nonlinear interpolation calculation and therefore, the accuracy of increased lattice points is improved and an excellent color conversion result can be obtained. Conversely, this amounts to an effect where excellent result can be obtained even with a small number of lattice points.

Meanwhile, the interval of the lattice points in the pre conversion color conversion table relates to the interpolation calculation. Hence, it is a further object of the present invention to provide a further preferable interval between lattice points.

According to a device of fabricating a color conversion table of the present invention, the pre conversion color conversion table is constituted by lattice points at uniform intervals.

Although the interval between lattice points may not necessarily be uniform in the nonlinear interpolation calculation, coefficients of calculating equations become complicated with a non uniform lattice interval. Further, at least in the case where lattice points are increased by interpolation calculation in a three-dimensional cubic body, an operation of calculating intermediate lattice points from a plurality of lattice points for each axial direction, is needed, and when in that case, coefficients of calculating equations become complicated, the interpolation calculation becomes complicated and the operation is troublesome. By contrast, according to the present invention constituted as described above, a situation where loop processing is easy to apply since some coefficients or the like become constant in the case of the uniform lattice point interval, is caused.

Accordingly, in the present invention, the nonlinear interpolation calculation can be prevented from being complicated by setting the lattice points of the pre conversion color conversion table at equal intervals by which reduction in calculation time period can be achieved.

Naturally, there may be a case that the intervals may preferably be uniform depending on other interpolation calculation except the nonlinear interpolation calculation or a case where the intervals are preferably nonuniform and intervals may be pertinently changed in accordance with the interpolation calculation.

Also, it is a further object of the present invention to provide a constitution where calculation other than the nonlinear interpolation calculation is used.

According to a device of fabricating a color conversion table of the present invention, the interpolating means comprises linear interpolation calculating means for performing an interpolation by a linear interpolation calculation from a corresponding relationship of a plurality of lattice points.

In the case of the linear interpolation, there is a merit where calculation equations per se are not complicated and there is a property where lattice points necessary for calculation are two points in respect of the axial direction. Accordingly, an accurate corresponding relationship can easily be obtained by finely distributing lattice points at portions where the corresponding relationship is significantly changed. Conversely, coarse distribution of lattice points can easily be performed at portions where the corresponding relationship is not significantly changed.

That is, according to the present invention, the interpolation calculation can be performed simply by utilizing linear interpolation having a small amount of equation. Further, there is provided a merit capable of achieving promotion of accuracy even with the easiness in liner calculation by densely distributing lattice points at portions of a significant change in the corresponding relationship by utilizing the easiness of the linear interpolation.

The number of lattice points which the interpolation calculating means increases is not necessarily constant. Hence, it is a further object of the present invention to flexibly deal with the number of lattice points.

According to a device of fabricating a color conversion table in the present invention, in respect of the interpolating means, the number of lattice points to be increased by interpolation can be selected.

The size of the color conversion table is changed by the increased number of lattice points and depending on the interpolation calculation, the lattice points may effect influence on the conversion accuracy in color conversion. Therefore, since the number of lattice points increased by interpolation is selectable, an optimum number of the lattice points in respect of environment of a user can be constituted.

That is, according to the present invention, the number of lattice points to be increased can be selected and accordingly, a color conversion table further flexibly suitable for environment of a user can be formed, as in determining the size of the color conversion table in conformity with storage resource of a user. Thereby, a plurality of sizes of color conversion tables can be formed and accordingly, the tables can be utilized by suitably selecting them as necessary.

Also, it is further object of the present invention to further simplify setting of lattice points.

According to a device of fabricating a color conversion table of the present invention, the interpolating means sets the increased number of lattice points in accordance with environment.

The size of the color conversion table is changed and the hit rate of color conversion is changed in accordance with the number of lattice points. Further, interpolation calculation is facilitated depending on positions of the increased lattice points. Therefore, optimum color conversion can be achieved by increasing lattice points synthetically in accordance with environment. As a policy of selecting lattice points increased in accordance with environment, when storage resource is large, a color conversion table having a large size may be provided, when promotion of color conversion accuracy is desired in the case where the more the lattice points, the higher the color conversion accuracy, the lattice points maybe increased and when multiplication or division at a power of 2 is easy in the interpolation calculation, the interval between the lattice points may be set to a length in accordance with the power of 2.

That is, according to the present invention, the lattice points having a number in accordance with environment are selected and therefore, a user does not have to carry out troublesome setting operation.

Further, in order to select lattice points which are increased with a similar object, according to a device of fabricating a color conversion table of the present invention, the interpolating means sets the increased number of lattice points in accordance with the kind of converted image.

As described above, there is the case where the more the lattice points, the higher the color conversion accuracy and in that case, depending on image, high color conversion accuracy may be required or not so high color conversion accuracy may be required. Therefore, when information of converted image requires high color conversion accuracy, the lattice points are increased as many as possible and when a not so high color conversion accuracy is required, the lattice points are not increased so much. As a policy in this case, for example, when the kind of converted image can be known from an operating system or the like, it is effective that the lattice points are increased as many as possible by determining that importance of color information is high as in photograph or the like if the expander of file is a bit map whereas the lattice points are not increased so much by determining that the importance of color information is low in the case where the expander of file designates a draw data or a business graph.

Therefore, according to the present invention, the increase in lattice points is selected in accordance with converted image and therefore, a disadvantage of enlarging excessively and unnecessarily the color conversion table or enlarging the color conversion table only insufficiently can be dispensed with.

Also, it is a further object of the present invention to be able to perform color conversion at a higher speed and accurately.

According to other aspect of the present invention, there is provided a device of fabricating a color conversion table in which the color conversion table is referred to by a computer, the pre conversion color conversion table is stored normally to an auxiliary storage device of the computer and is spread in a main storage region of the computer when the reference of the color conversion table is executed.

When a computer refers the color conversion table, the operation is at a high speed if the table is spread in a so-called main storage region. Meanwhile, much capacity is needed to the color conversion table and accordingly, it is waste of resource to always spread the table in the main storage region. Therefore, the pre conversion color conversion table is normally stored to an auxiliary storage device of the computer and is spread to the main storage region of the computer in referring to the color conversion table.

Thereby, effective use of resource and high speed can be realized. In this case, the main storage region must be interpreted in a broad sense and it may be RAM in respect of CPU or a volatile RAM disc or the like. That is, a storage medium capable of accessing at a high speed and permitting only temporary use may be applied.

Naturally, specific examples of the thought of the present invention are not necessarily limited to the above-described but according to other example of the present invention, there is provided a method of fabricating a color conversion table for forming the color conversion table where lattice points in a pre conversion color representing space are corresponded by grey scale color representing data in a post conversion color representing space in order to convert the grey scale color representing data between the different color representing spaces, in which the lattice points are formed to increase by interpolation calculation.

Accordingly, the present invention is not necessarily limited to a substantial device but is effective as a method thereof.

By the way, there are cases where the color conversion device having such a color conversion table is present by itself or is utilized in a state where it is integrated to a certain instrument, and so on and accordingly, the thought of the present invention is not limited thereto but the present invention includes various embodiments. Accordingly, the present invention can be pertinently changed to a software, a hardware or the like.

As an example thereof, in converting grey scale color representing data in a different color representing space to a color representing space in correspondence with a print ink, there may be provided a constitution where a pre conversion color conversion table storing a corresponding relationship of conversion at a small number of lattice points, is used, a color conversion table is formed by increasing the lattice points by interpolation calculation and the color conversion is performed by utilizing the formed color conversion table.

That is, the printer driver refers the color conversion table for converting the grey scale color representing data of the different color representing space in respect of the color representing space in accordance with a print ink and in that case, the lattice points are increased by performing an interpolation from the pre conversion color conversion table at a small number of the lattice points and the color conversion is performed by using the color conversion table where the lattice points are increased.

When an example of implementing the thought of the present invention is constituted by a software of a color conversion device, the example is naturally present on a record medium for recording the software and is utilized. Naturally, the record medium may be a magnetic record medium or may be a photomagnetic record medium and may quite similarly be any record medium to be developed in the future. Further, the same goes with stages of copying a primarily copied product, a secondarily copied product or the like. Additionally, in the case of a software, in the installing operation, the processing of increasing lattice points can be performed and even in the case where a communication network is utilized as supply method, the present invention is invariably utilized. In this case, the side of providing the software by utilizing a communication network, functions as a software providing device and the present invention is similarly utilized.

Further, the thought of the present invention remains unchanged even in the case where the present invention is realized partially by a software and partially by a hardware and the present invention may be of a mode where a portion of the present invention is stored on a record medium and is read pertinently as necessary. Furthermore, the present invention is naturally applicable to a color facsimile device, a color copier, a color scanner, a digital still camera, a digital video camera or the like utilizing such a color conversion table.

BRIEF DESCRIPTION OF THE DRAWINGS

FIG. 1 is a block diagram of an image processing system to which a device of fabricating a color conversion table according to an embodiment of the present invention is applied;

FIG. 2 is a block diagram of an example of a specific hardware constitution of the image processing system;

FIG. 13 is a view of coding a spline interpolation calculation by C language;

DESCRIPTION OF THE PREFERRED EMBODIMENT

Figure 3:
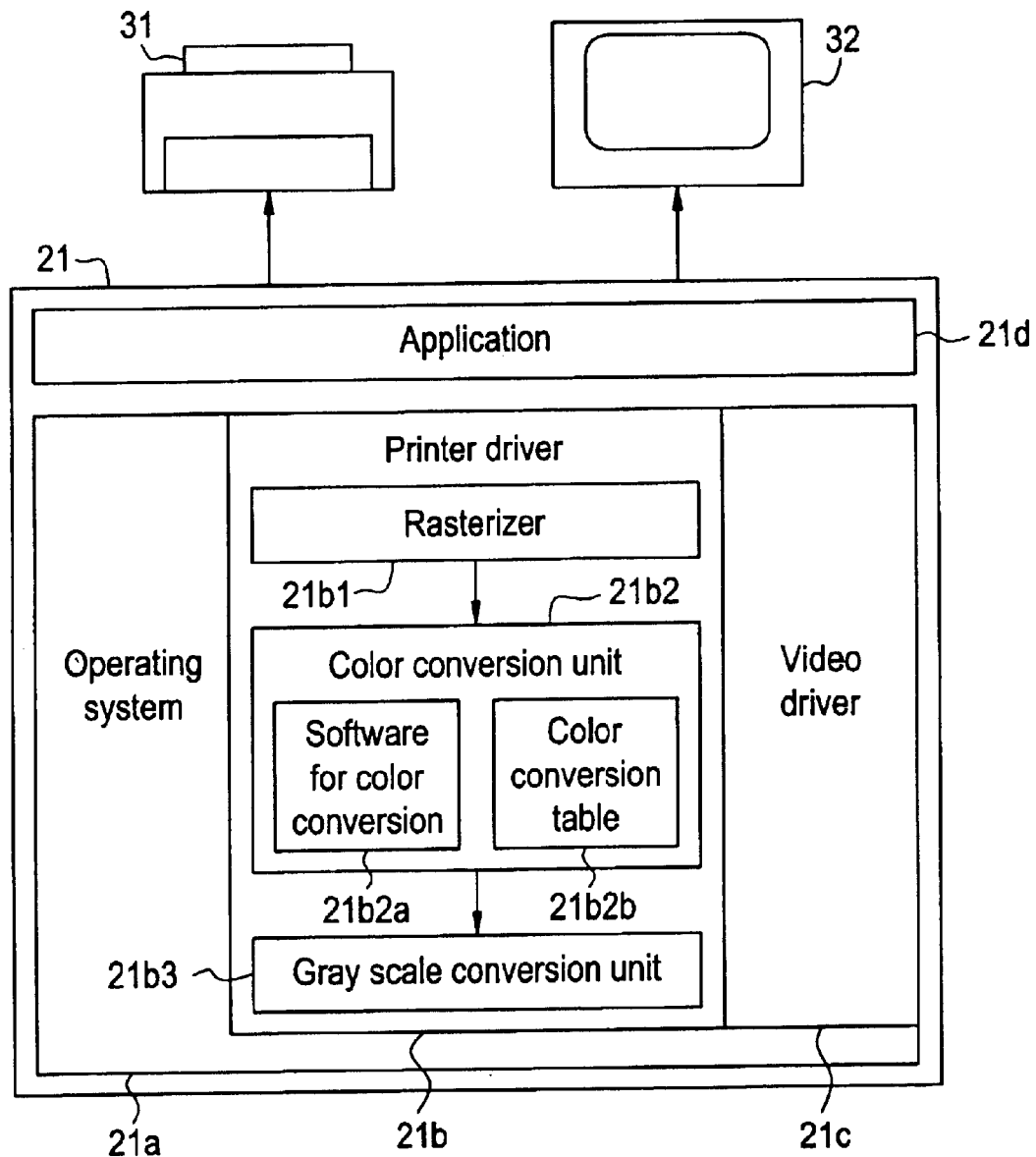
FIG. 3 is a block diagram showing a software constitution of a computer.

An explanation will be given of embodiments of the present invention in reference to the drawings as follows.

FIG. 1 shows an image processing system according to an embodiment of the present invention by a block diagram and FIG. 2 shows a specific example of a hardware constitution by a block diagram.

In FIG. 1 and FIG. 2, an image input device 10 photographs color images or the like and outputs grey scale color representing data to an image processing device 20 and the image processing device 20 performs a predetermined image processing in respect of the data and outputs the data to an image output device 30 and the image output device 30 displays original color images.

In this case, the image input device 10 corresponds to a scanner 11, a digital still camera 12 or the like as a specific example, the image processing device 20 corresponds to a computer system comprising a computer 21, a hard disk 22, a keyboard 23, a CD-ROM drive 24, a floppy disk drive 25, a modem 26 or the like as a specific example and the image output device 30 corresponds to a printer 31, a display 32 or the like. Further, the modem 26 is connected to a public communication network, connected to an outside network via the public communication network and can introduce by downloading software or data from a file server 27. Accordingly, not only a floppy disk, a CD-ROM or the like constitutes a record medium but a communication network is naturally included in a record medium.

When the scanner 11 as the image input device 10 outputs grey scale data of, for example, RGB (red, green, blue) as grey scale color representing data and further, the printer 31 as the image output device 30 needs to input CMY binary data of (cyan, magenta, yellow) as grey scale color representing data, a specific role of the computer 21 as the image processing device 20 is converting the RGB grey scale data into the CMY binary data. Further, even when the display 32 inputs grey scale data of RGB, the color characteristic normally differs between the scanner 11 and the display 32 and accordingly, the computer 21 performs a processing of converting the grey scale data of RGB into the grey scale data of RGB. Substantially the same is applicable to the digital still camera 12.

FIG. 3 shows processings carried out inside of the computer 21. As shown by FIG. 3, in the computer 21, an operating system 21a is operated and a printer driver 21b and a video driver 21c corresponding to the printer 31 and the display 32 are integrated. Meanwhile, execution of processings of an application 21d is controlled by the operating system 21a and the application 21d executes predetermined processings in cooperation with the printer driver 21b or the video driver 21c as necessary.

Print data formed by the application 21d is inputted to the printer driver 21b via the operating system 21a and the printer driver 21b converts the print data into image data having a format requested by the printer 31. The conversion corresponds to the above-described processing of converting grey scale data of RGB into binary data of CMY. In this case, the printer driver 21b comprises a rasterizer 21b1 cutting out a scanning range of a print head in the printer 31 from image data formed by the application 21d by a unit of predetermined screen, a color conversion unit 21b2 for converting grey scale data of RGB into grey scale data of CMY in reference to a color conversion table in respect of each pixel in the scanning range, and a grey scale conversion unit 21b3 for converting grey scale data of CMY into binary data in grey scale conversion. Further, display image data formed by the application 21d is written to a predetermined memory for screen by the video driver 21c and is displayed on the display 32 via a hardware circuit.

Figures 4, 5, 6:
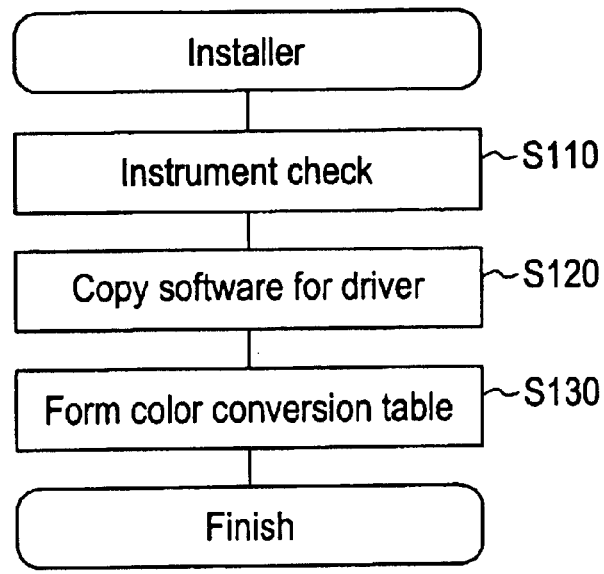
FIG. 4 is a view showing concept of a three-dimensional look-up table.
FIG. 5 is a flow chart of an install program.
FIG. 6 is a view of coding Lagrange interpolation calculation by C language.

The color conversion unit 21b2 is also referred to as a color correction module and is constituted by a software for color conversion 21b2a, for executing calculation processing of color conversion, and a color conversion table 21b2b. The color conversion table 21b2b corresponds grey scale color representing data in a post conversion color representing space to lattice points in a pre conversion color representing space for converting grey scale color representing data between different color representing spaces and more specifically, the color conversion table 21b2b comprises a three-dimensional look-up table for reading CMY grey scale data with three-dimensional RGB grey scale data as coordinate values as shown by FIG. 4. Further, the software for color conversion 21b2a carries out a processing of reading CMY grey scale data with RGB grey scale data of respective pixels as coordinate values.

The printer driver 21b including the color conversion unit 21b2 is spread on the hard disc 22 by an install program shown by FIG. 5. The installer is constituted by step S110 of carrying out instrument check, step S120 of spreading on the hard disc 22 a software for driver including the software for color conversion 21b2a and step S130 of forming the color conversion table 21b2b having a predetermined size from a pre conversion color conversion table 21b2c having a small size by a predetermined interpolation calculation.

That is, the step S130 itself of forming the color conversion table 21b2b having a predetermined size from the pre conversion color conversion table 21b2c having a small size by interpolation calculation, constitutes a device of fabricating a color conversion table according to the present invention and the procedure constitutes a method of fabricating a color conversion table. Although an explanation will be given of the specific method, according to the embodiment, the invention is implemented as the installer of the printer driver 21b, the requisite of function is forming the color conversion table 21b2b having a predetermined size from the pre conversion color conversion table 21b2c having a small size. Therefore, the requisite may be satisfied by a software of forming a color conversion table by itself or may be constituted by a hardware or the like comprising a wired logic. Further, as mentioned later, the software for color conversion 21b2a may be constituted to form the color conversion table 21b2b as necessary.

Next, a detailed explanation will be given of the interpolation calculation processing.

First, an explanation will be given of a case where nonlinear interpolation calculation is adopted as an example of interpolation calculation processing.

When n points (Xi, Yi) (i=0, 1, . . . , n−1) are given, a polynomial of (n−1)-th order satisfying Yi=P(Xi) (i=0, 1, . . . , n−1) is uniquely determined as follows.

$$P(x) = c_{n-1} \cdot X^{}(n-1) + c_{n-2} \cdot X^{}(n-2) + \ldots \quad (1)$$

However, no two of Xi are equal to each other. A closed equation representing the polynomial is the Lagrange interpolation equation shown below.

$$P(X) = \sum_{i=0}^{N-1} \left\{ Y_i \prod_{j \neq i} ((X - X_j)/(X_i - X_j)) \right\} \quad (2)$$

Incidentally, terms after Π on the right side signifies a multiplication of ((X−Xj)/(Xi−Xj)) with respect to all of j except j=i. FIG. 6 shows a coding list showing a specific method of executing the interpolation calculation by C language.

Figure 7:
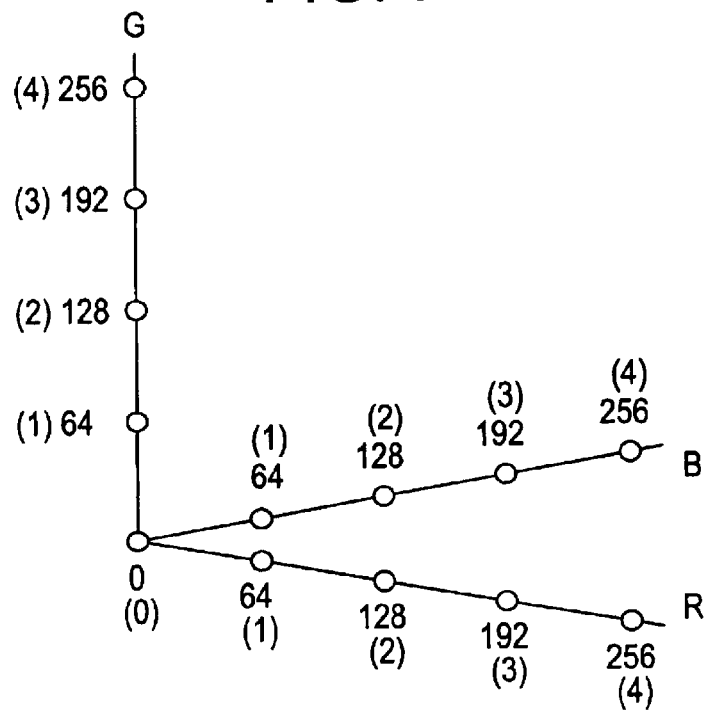
FIG. 7 is a view showing lattice coordinates of a pre conversion color conversion table.

Now, when such an interpolation calculation is used, by using the pre conversion color conversion table 21b2c having a small size of actually only five lattice coordinates in the respective axial direction as illustrated by FIG. 7, an interval between the lattice coordinates can be divided in four by adding three new lattice coordinates between the respective lattice coordinates. The interval between the lattice coordinates in this case correspond to "64" grey scales and lattice numbers "0" through "4" are added to each of the lattice coordinates of the pre conversion color conversion table 21b2c. Further, by newly dividing in four the interval between the lattice coordinates, the color conversion table 21b2b is provided with lattice numbers "0" through "16" and the interval between the lattice coordinates becomes "16" grey scales. Incidentally, it is inherently impossible to provide lattice points uniformly divided in such a way as "250" grey scales and in calculation, lattice numbers of "0" through "256" (actual grey scale number+1) are assumed and at a final stage of calculation, the last lattice number (for example, 256) is shifted to the last lattice number of actual grey scale (corresponding to 255) by which the calculation is simplified.

Figure 8:
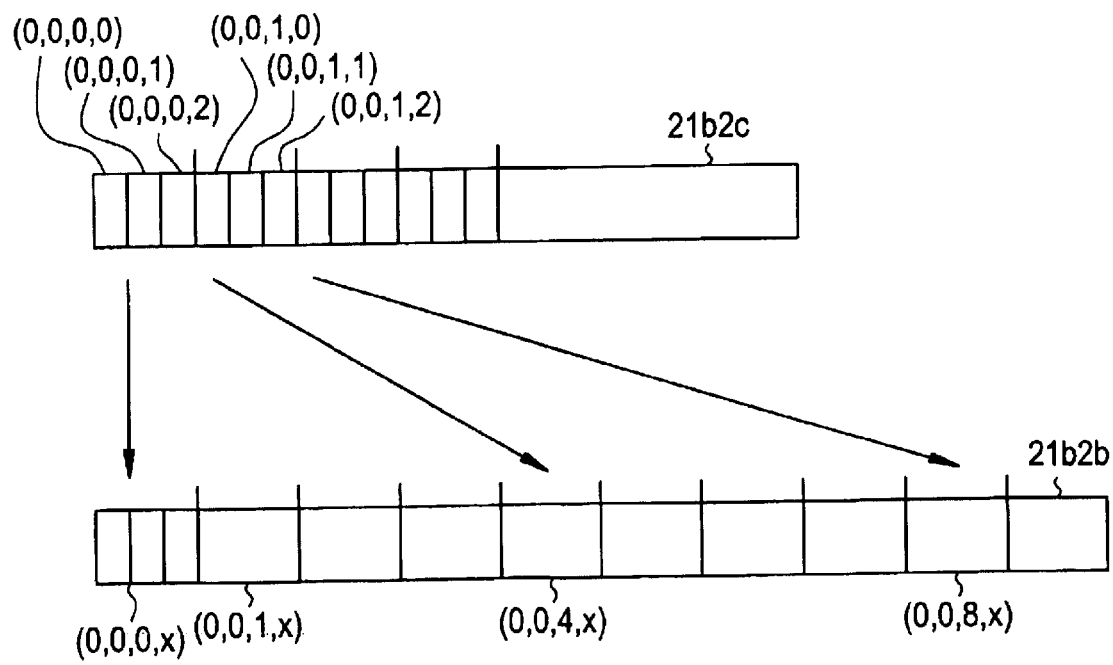
FIG. 8 is a view showing file structures of a pre conversion color conversion table and a color conversion table.

Explaining an outline of a storage format in the install program of the pre conversion color conversion table 21b2c, as shown by an upper stage of FIG. 8, the storage format is constituted by an arrangement having a number of elements of (5, 5, 5, 3) in order to correspond to respective three colors of data CMY with respective components of RGB as coordinate values and is written with no rearrangement from the start of the file. Accordingly, in order to refer data corresponding to the pre conversion color conversion table 21b2c, lattice number pointers Pr, Pg and Pb respectively corresponding to R axis, G axis and B axis, are set, (Pr×5×5×3+Pg×5×3+Pb×3) is determined as an offset address from the start of the file and cyan (C) reads "1" byte, magenta (M) reads "2" byte and yellow (Y) reads "3" byte.

Naturally, such a storage format is only an example, and, for example, an arrangement where cyan is arranged for all the coordinates, and magenta and yellow are arranged successively for all the coordinates may be used. Or, the table may be preserved in a state of compressing the file. However, when the arrangement is written with no rearrangement, as mentioned later, the read address can be calculated by a pointer value and the regularity in reading can freely be set.

Meanwhile, the storage format of the color conversion table 21b2b is shown at a lower stage of FIG. 8. As mentioned above, the interval between the lattice points of the pre conversion color conversion table 21b2c are divided in four to constitute new three lattice coordinates and accordingly, an arrangement having a number of elements of (17, 17, 17, 3) is formed and the table is written from the start of the file with no rearrangement. Accordingly, in order to refer to data corresponding to the color conversion table 21b2b, when the lattice number pointers Pr, Pg and Pb similar to the former case are set, (Pr×17×17×3+Pg×17×3+Pb×3) is determined as an offset address from the start of the file and cyan (C) reads "1" byte, magenta (M) reads "2" byte and yellow (Y) reads "3" byte.

Figure 9:
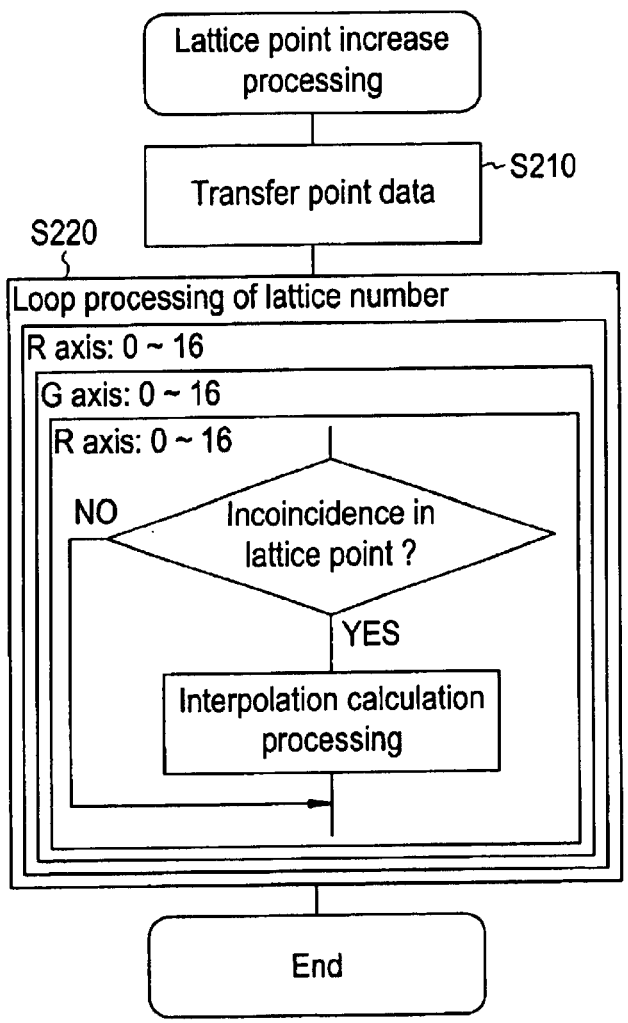
FIG. 9 is a flowchart of a lattice point increase processing program.

FIG. 9 shows a flow chart of a processing for increasing lattice points of the color conversion table 21b2b. According to the processing, as shown by FIG. 8, there are lattice points where the pre conversion color conversion table 21b2c coincides with the color conversion table 21b2b and accordingly, at step S210, while conducting an operation of transferring data of lattice points, data at vacant portions are inserted between the lattice points and are spread as a form of the file on the hard disc 22. Thereafter, a loop processing nesting in respect of the lattice numbers of the respective axes is executed in order to fill corresponding data in respect of all the lattice points of the color conversion table 21b2b at step S220. The lattice numbers are "0" through "16" and accordingly, "0" through "16" are set to pointers in respect of R axis, G axis and B axis and the processing is repeated. At the innermost loop, it is determined that lattice points designated by pointers of R axis, G axis and B axis coincide with lattice points transferred from the pre conversion color conversion table 21b2c and when the data do not coincide with each other, a processing of calculating data corresponding to lattice points is executed by interpolation calculation. However, when they coincide with each other, the processing of interpolation calculation is skipped since corresponding data have already been provided.

Figure 10:
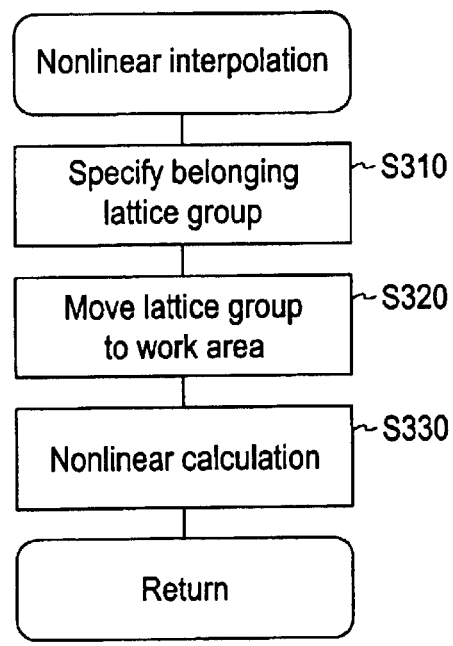
FIG. 10 is a flowchart of a nonlinear interpolation program.
Figure 11:
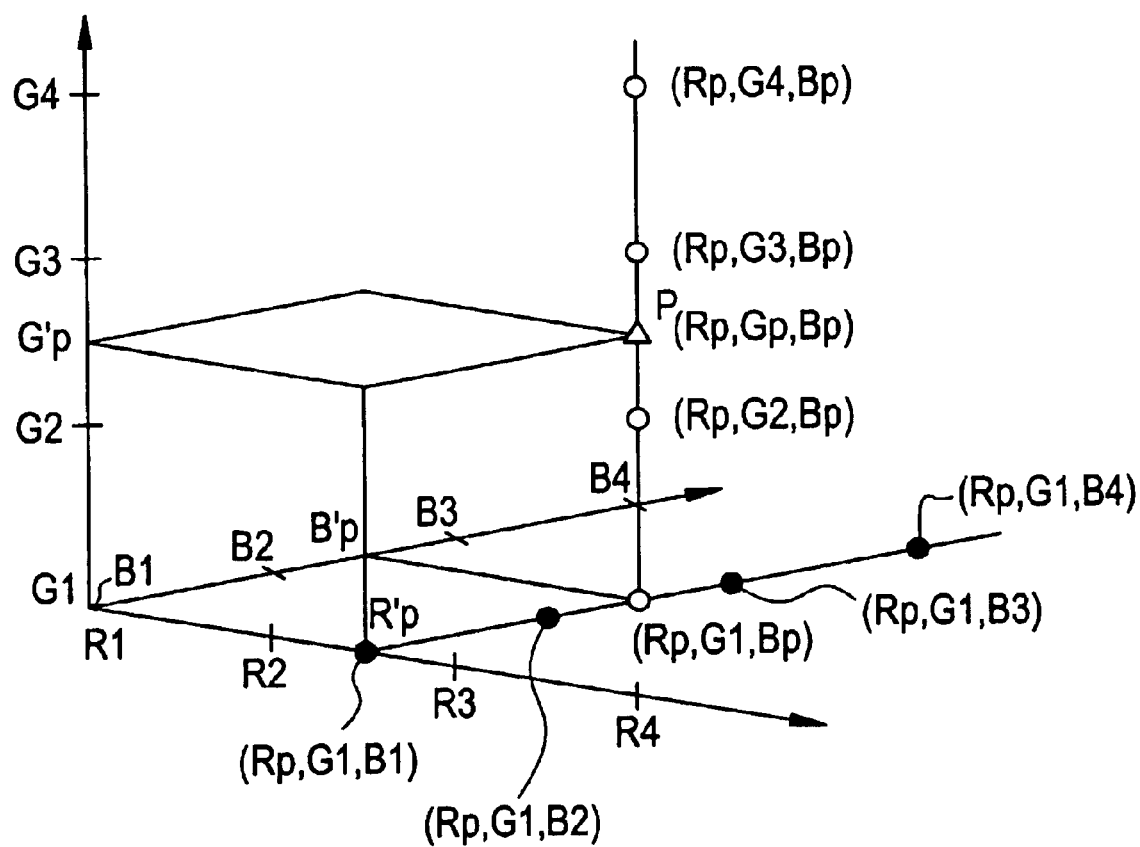
FIG. 11 is a conceptual view showing the procedure in a case where nonlinear interpolation is performed by Lagrange interpolation equation.
Figure 12:
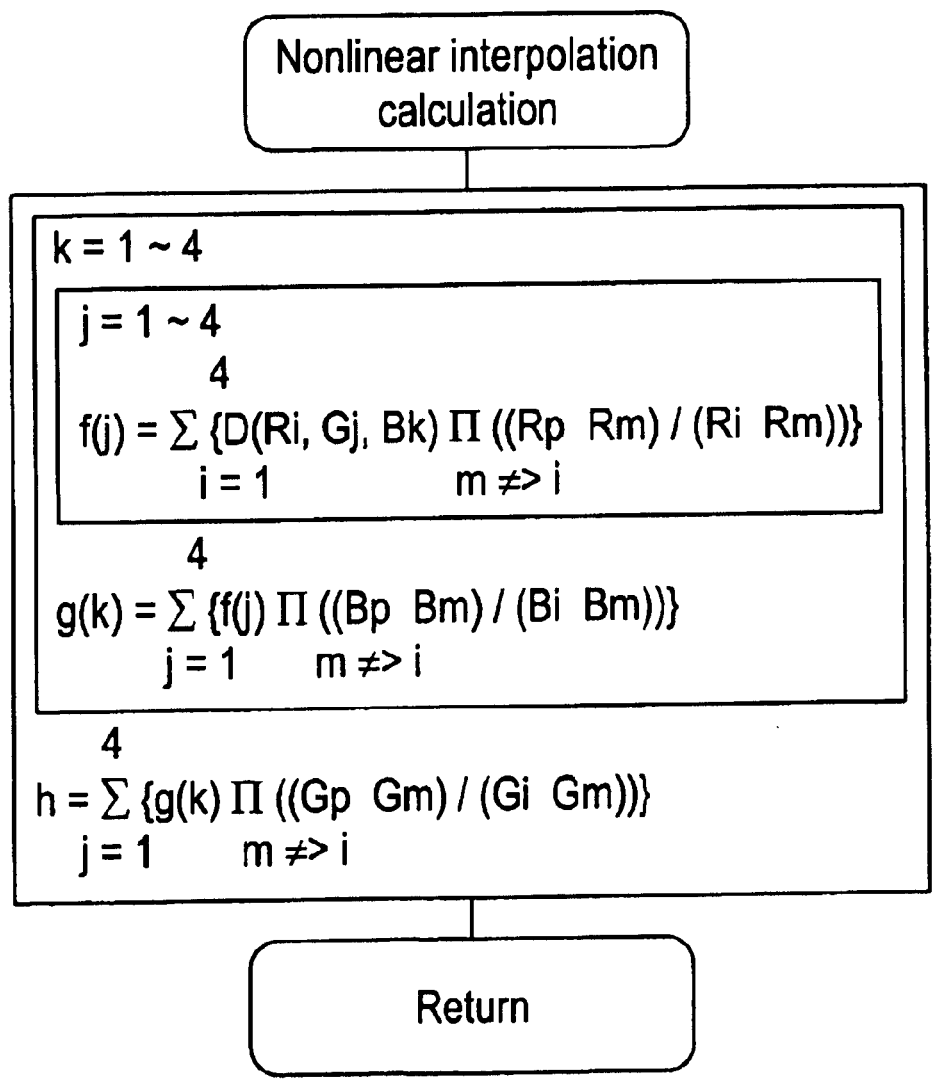
FIG. 12 is a flow chart in correspondence with Lagrange interpolation calculation.

FIG. 10 through FIG. 12 show an example of a processing of interpolation calculation. First, an explanation will be given of the concept of nonlinear calculation shown by FIG. 11.

When the Lagrange interpolation equation shown by Equation 2 is applied based on four points of corresponding data, even in the case where interpolation calculation of point P (Rp, Gp, Bp) shown by FIG. 11 is intended to perform, whether the interpolation passes through four lattice points is not necessarily known. Therefore, a cubic body comprising four lattice points in respective axial direction before and after the position of point P is assumed and interpolation calculation is executed successively for each axial direction in the cubic body by which data corresponding to four points necessary for calculation of point P, are calculated. Here, the lattice coordinates at the respective axes are set to {R1, R2, R3, R4}, {G1, G2, G3, G4} and {B1, B2, B3, B4}.

First, assume a straight line in parallel to the G axis direction passing through point P (point illustrated by a mark Δ), then, the straight line penetrates four RB planes passing through the lattice coordinates of G axis. The respective intersections are designated by ○ points in FIG. 11 and coordinates thereof are (Rp, G4, Bp), (Rp, G3, Bp), (Rp, G2, Bp) and (Rp, G1, Bp). Data corresponding to the intersections per se are not known and therefore, straight lines in parallel to B axis on RB planes intersecting with the intersections are assumed. The straight lines penetrate four RG planes passing through lattice coordinates of B axis. Attention is paid to the point that the coordinate of G axis becomes "G1" in the four straight lines and respective intersections are designated by ● points in FIG. 11. Coordinates thereof are (Rp, G1, B1), (Rp, G1, B2), (Rp, G1, B3) and (Rp, G1, B4) and data corresponding thereto are not yet known. However, when straight lines in parallel to R axis passing through the intersections, are assumed, then, all of the straight lines pass through the lattice points in this case. That is, a straight line passing through the intersection (Rp, G1, B1), passes through (R1, G1, B1), (R2, G1, B1), (R3, G1, B1) and (R4, G1, B1).

By retrogressing the procedure, data corresponding to one ● point can be provided from four of (R1, G1, B1), (R2, G1, B1), (R3, G1, B1) and (R4, G1, B1) and when data corresponding to four of points are similarly provided, data corresponding to one point can be provided. By repeating this procedure, data corresponding to four of ○ points can be provided by which data corresponding to Δ point can be calculated.

FIG. 12 shows more specific calculation of such a procedure. At an innermost nest, data D (Ri, Gj, Bk) corresponding to four lattice points where i=1 through 4 are utilized, and data f(j) (data corresponding to ● points) corresponding to the component value Rp in R axis direction are calculated. When four of f(j) are provided by defining j as j=1 through 4, data g(k) (data corresponding to ○ point) corresponding to the component value Bp in B axis direction by utilizing f(j) in a higher nest. Further, when four of g(k) are provided by defining k as k=1 through 4, in the highest nest, h (data corresponding to Δ point) can be calculated by utilizing g(k).

Referring back to the flow chart shown by FIG. 10, at step S310, specification of a belonging lattice group is executed. When the calculation is executed by fixing four lattice points in the respective axial directions as shown by FIG. 11 and FIG. 12, the calculation is facilitated and accordingly, the routine of the calculation is formed by a subroutine in which calculation can be executed by utilizing coordinate values of the cubic body. Accordingly, a cubic body comprising four lattice points in each axial direction is specified such that the lattice points are included before executing the calculation for interpolating the lattice points. Further, at step S320, data corresponding to the lattice points of the cubic body is moved to a work area.

In the work area, the relationship shown by FIG. 11 is specified and therefore, in successive step S330, nonlinear calculation is executed by the nesting processing shown by FIG. 12. Incidentally, in moving the data to the work area, offsets in the respective directions are caused and therefore, in moving the data, the offset amounts are preserved and lattice points to be increased are calculated by coordinate value (Rp, Gp, Bp) formed by considering the offset amounts in respect of the coordinate values of the increased lattice points. Further, although three stages of nesting processings are performed in FIG. 12 in correspondence with three-dimensional interpolation, the nesting processings can be performed in correspondence with interpolation at a higher order.

In this way, by performing nonlinear calculation at lattice points except the lattice points of the pre conversion color conversion table 21b2c, the complete color conversion table 21b2b can be provided when the loop processings in respect of the respective axes have been finished.

Although according to the above-described embodiment, the Lagrange interpolation equation is used as a specific processing for nonlinear calculation, other calculations may be utilized, for example, spline interpolation can be performed. The spline interpolation can be utilized in the case where even derived functions are provided with continuity and in that sense, the spline interpolation is a rather careful interpolation that is provided in the case where the continuity poses a problem. However, the calculation is obliged to become complicated and FIG. 13 shows a coding list indicating a specific method of executing the spline interpolation calculation by C language.

Further, as other nonlinear interpolation calculations, Neville interpolation, Newton interpolation and the like can be utilized. In these cases, the calculation is facilitated also numerically.

Meanwhile, the lattice interval is made constant in respect of the above-described lattice points. Thereby, the corresponding data is moved with a specific cubic body as a work area and the calculation can be executed comprehensively. However, the lattice interval has not necessarily to be constant and the calculation can be executed by utilizing a coefficient in consideration of the lattice interval or the like.

Further, although in the above-described embodiment, the nonlinear interpolation shown by FIG. 10 through FIG. 12 is utilized in the interpolation calculation processing at step S220, linear interpolation shown by FIG. 14 through FIG. 19 can be utilized.

Figure 14:
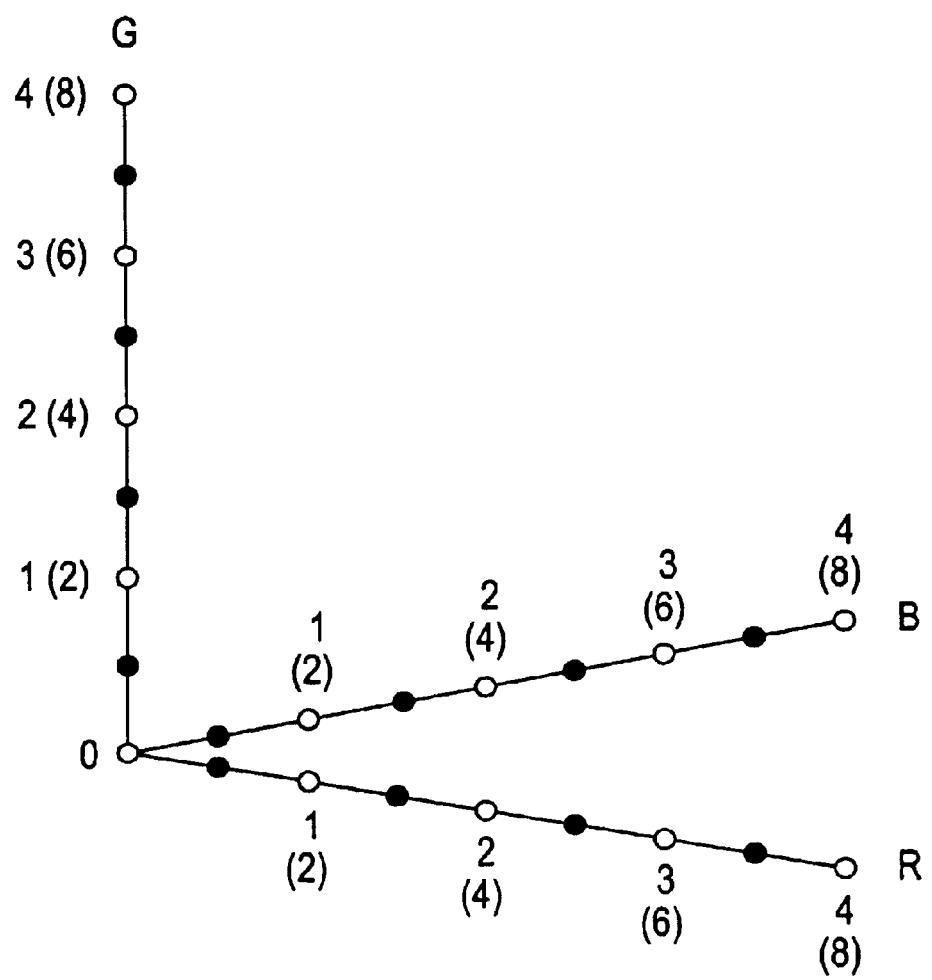
FIG. 14 is an explanatory view showing lattice coordinates before and after increasing lattice points.
Figure 15:
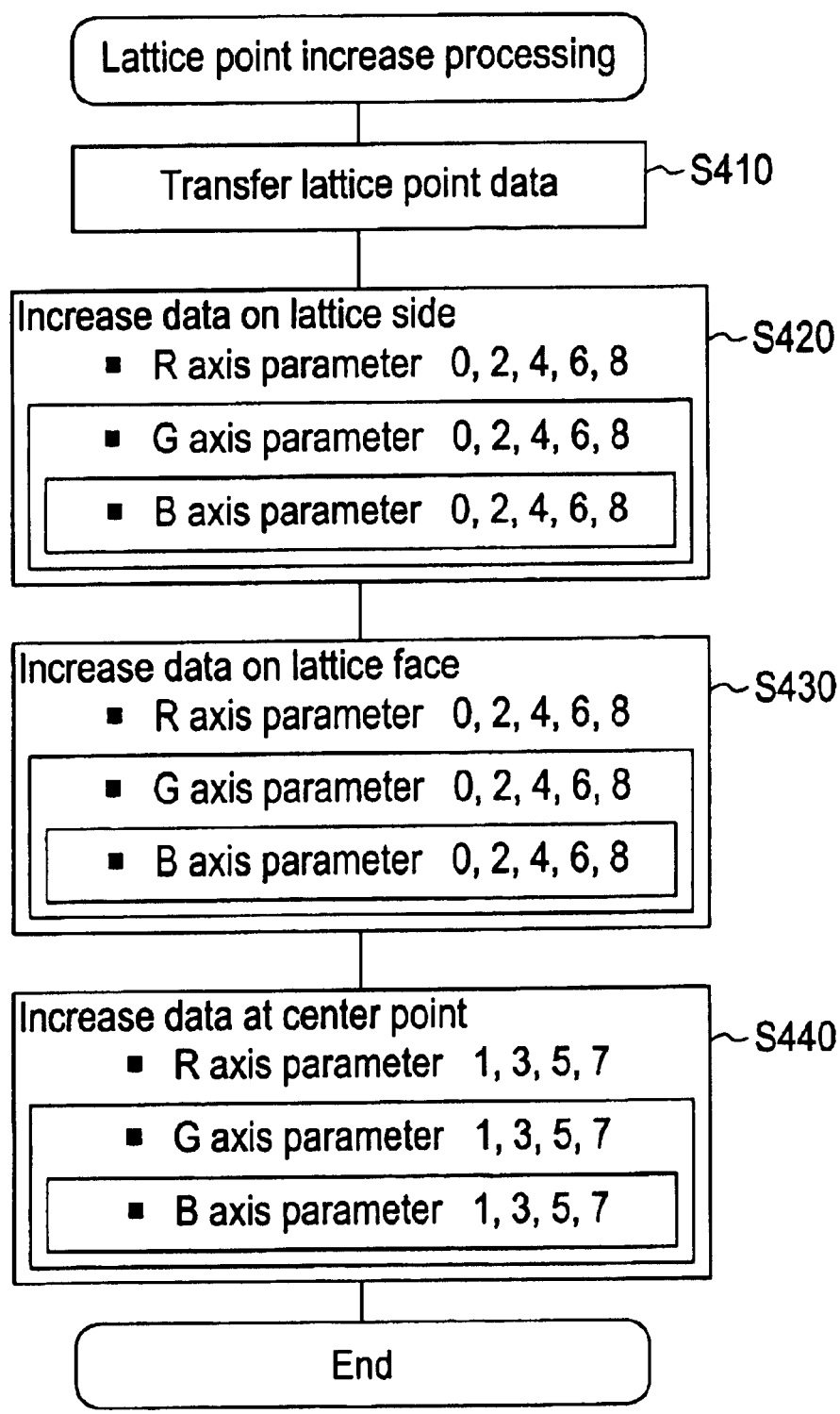
FIG. 15 is a flowchart of a processing program of increasing lattice points of linear interpolation.
Figure 16:
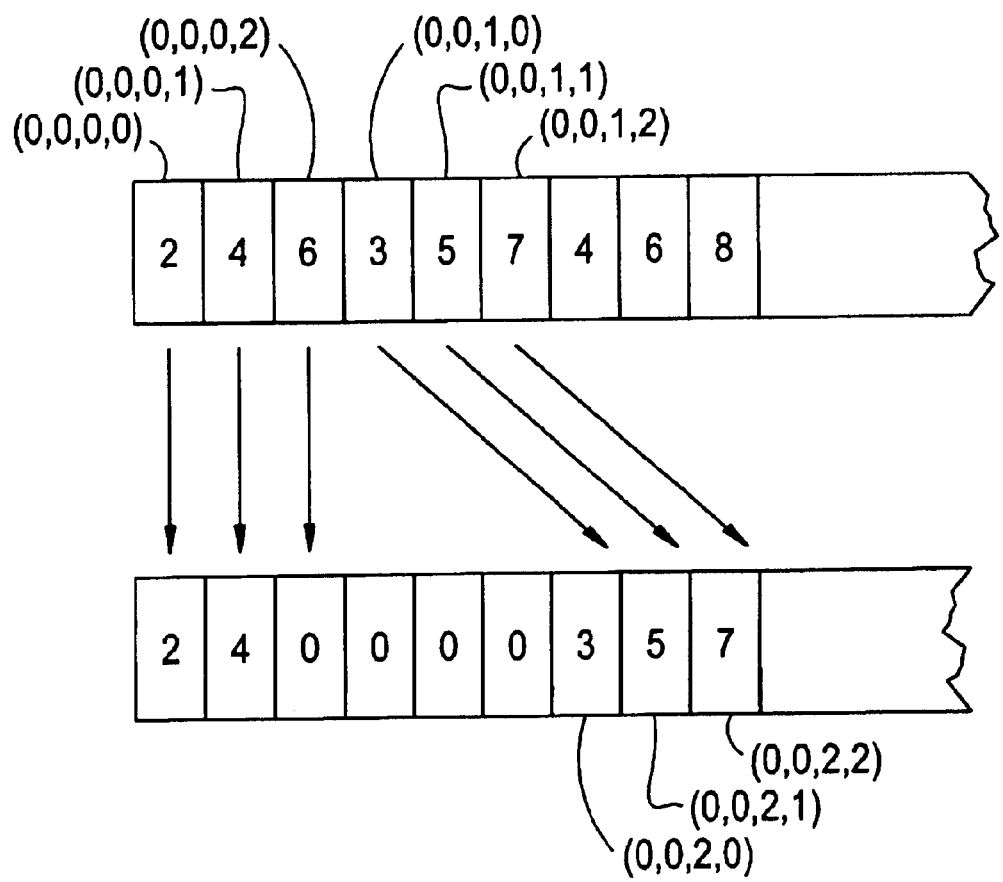
FIG. 16 is a view showing file structures of a pre conversion color conversion table and a color conversion table.
Figure 17:
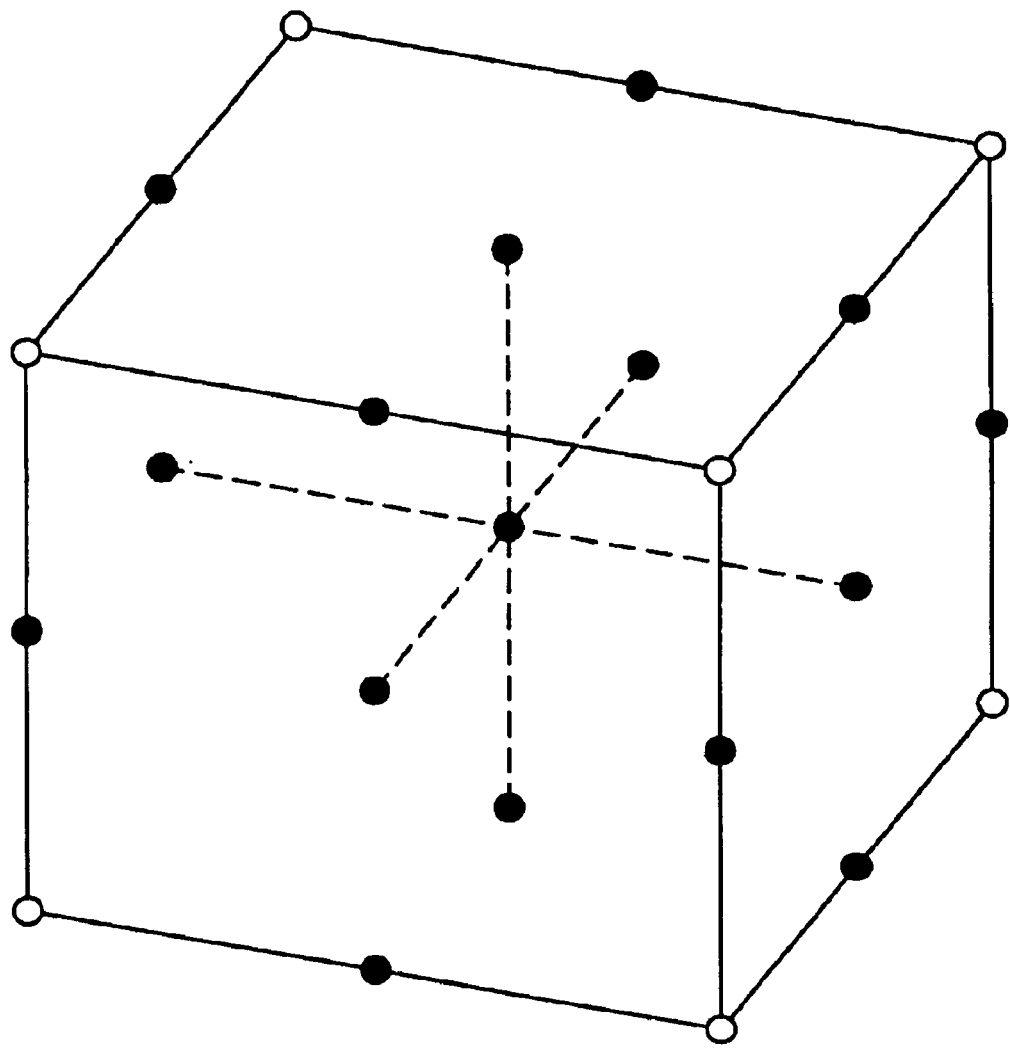
FIG. 17 is an outline explanatory view showing positions of interpolated lattice points.
Figure 18:
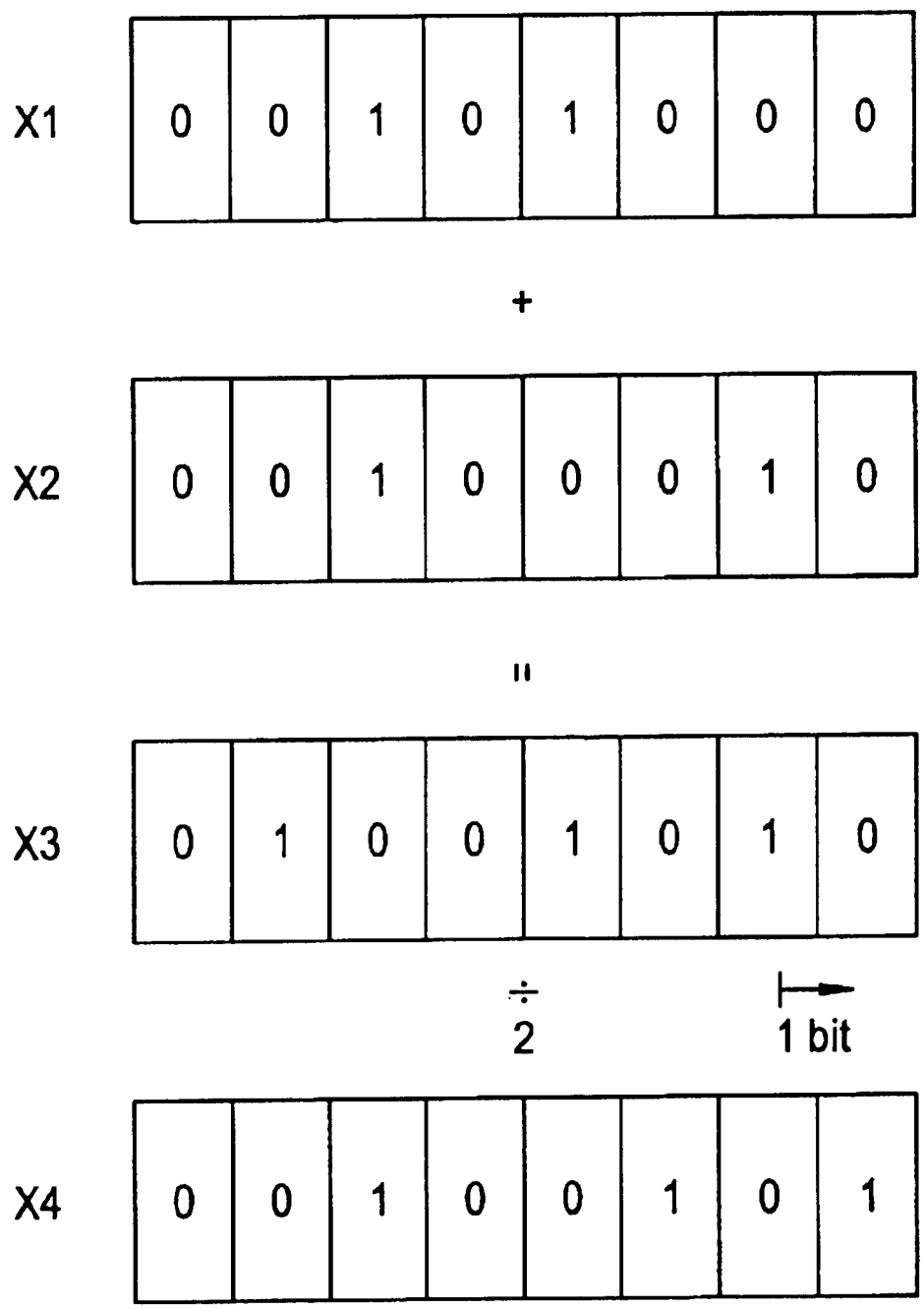
FIG. 18 is an explanatory view showing a state of a calculation also using bit shift.

In FIG. 14, positions of lattice points before increasing lattice points, are designated by white circles and positions of lattice points after increasing lattice points are designated by black circles and new lattice points are provided at positions halving a lattice interval for simplifying calculation. Accordingly, illustrated initial lattice numbers become lattice numbers twice as much as the initial lattice numbers as shown by bracketed numbers. Incidentally, an explanation will be given by assuming a number of initial lattice points as "i". Further, FIG. 15 shows a procedure of CPU executing processings of linear interpolation by a flow chart, FIG. 16 shows a situation of moving initial corresponding data, FIG. 17 shows lattice points to be interpolated and FIG. 18 shows a situation of interpolation calculation.

Assume that lattice points halving lattice point intervals are formed at respective axes, lattice coordinates of lattice points before interpolation become automatically (0, 2, 4, 6, 8 . . . ) as shown by bracketed numbers and interpolation is performed therebetween. Referring back to the flow chart shown by FIG. 15, first, at step S410, CPU performs a processing of shifting lattice point data already in the table to predetermined positions of a new table. For example, as shown by FIG. 16, data corresponding to lattice coordinates (0, 0, 0) is shifted to become data corresponding to lattice coordinates (0, 0, 0) of the new table, data corresponding to lattice coordinates (0, 0, 1) is shifted to become data corresponding to lattice coordinates (0, 0, 2) of the new table, data corresponding to lattice coordinates (0, 0, 2) is shifted to become data corresponding to lattice coordinates (0, 0, 4) of the new table and so forth.

When the interpolation calculation is performed by linear interpolation in respect of lattice points, the calculation differs depending on a position in a lattice cubic body comprising surrounding eight lattice points. That is, in the case of a lattice point present on the side, the interpolations is performed from two lattice points on the both sides, in the case of a lattice point present on a face, the interpolation is performed from surrounding four lattice points, and in the case of a lattice point present at a center, the interpolation is performed from eight lattice points.

As an order of increasing lattice points, first, at step S420, a processing of forming lattice points on lattice sides is carried out. According to a calculation processing of CPU, the processing is performed by loops of nesting by providing parameters for respective axes and accordingly, also in FIG. 15, blocks are displayed in a nest-like shape.

Parameters of "0", "2", "4", "6", "8" . . . are given to respective axes, and in respect of R axis direction, data corresponding to lattice coordinates (1, 0, 0) is formed from data of lattice coordinates (0, 0, 0) and (2, 0, 0). That is, as shown by FIG. 18, data X1 corresponding to lattice coordinates (0, 0, 0) and data X2 corresponding to lattice coordinates (2, 0, 0) are added together and a result X3 thereof is divided by "2" to result in X4. In this case, the division by "2" correspond to a shift in the right by 1 bit in binary data, which can be executed extremely easily. Naturally, addition may be performed after executing a shift in the right by 1 bit initially and in this case, overflow in calculation procedure can be prevented. Hereinafter, lattice points on lattice sides are formed from all of combinations of the parameters.

In step S430, a processing of forming lattice points on a lattice face is executed. Also in this case, the processing is performed by a nested loop and accordingly, "0", "2", "4", "6", "8" are given as parameters of respective axes and in respect of a face in parallel to RG face, data corresponding to lattice coordinates (1, 1, 0) is formed from data of lattice coordinates (0, 0, 0), (0, 2, 0), (2, 0, 0) and (2, 2, 0). In this case, an average value of four lattice points is calculated and therefore, four data are added together and the result of addition is divided by "4". Incidentally, the division by "4" corresponds to a shift in the right by 2 bits in binary data, which can be executed extremely easily and hereinafter, lattice points on lattice faces are formed from all of combinations of the parameters.

Finally, a processing of forming a lattice point of a center point is executed in step S440. In this case, "1", "3", "5", "7" . . . are given as parameters of respective axes and data corresponding to lattice coordinates (1, 1, 1) is formed from data corresponding to surrounding eight lattice coordinates (0, 0, 0), (0, 0, 2), (0, 2, 0), (0, 2, 2), (2, 0, 0), (2, 0, 2), (2, 2, 0) and (2, 2, 2). In this case, an average value of eight lattice points is calculated and the addition may be performed after executing a shift in the right by 3 bits such that overflow may not be caused. Thereafter, the lattice points of all the center points are formed from all the combinations of the parameters.

By performing the above-described processings, the interpolation of lattice points is finished. Although according to the embodiment, the lattice points are increased to halve the lattice intervals, the present invention is not limited to this example but the lattice points can be increased or decreased pertinently as necessary and lattice points may be increased in an allowable range of storage resource.

Further, although the lattice interval between lattice points is constant in the above-described linear interpolation calculation, according to the linear interpolation, even if the lattice interval is pertinently changed, the calculation even with the change in the lattice interval is easy since the calculation is performed on the basis of corresponding data at two points on both sides. Accordingly, the interpolation accuracy can be promoted while the calculation is performed easily by finely setting the lattice interval at a portion having a curve of a large change in corresponding data.

Meanwhile, in either of the nonlinear interpolation and the linear interpolation, lattice points to be increased have not necessarily have to be constant but can be changed as necessary.

Figure 19:
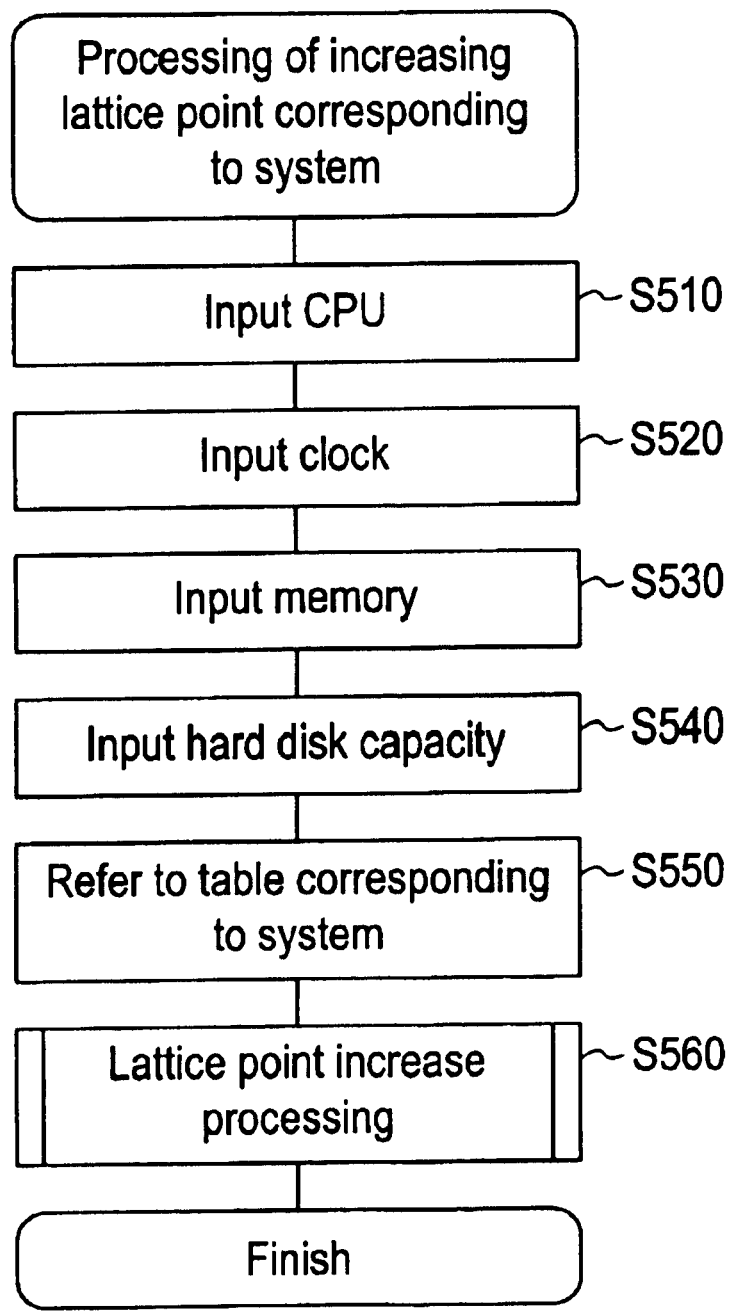
FIG. 19 is a flowchart of a processing program of increasing lattice points in correspondence with a system.

As an example of the processing of increasing lattice points, according to the flow chart of FIG. 19, a processing of increasing lattice points in correspondence with a system where the table is formed in accordance with the constitution of instruments of a system, is shown.

In this example, at step S510, a kind of CPU representing calculation capacity is inputted, at step S520, a clock representing calculation speed is similarly inputted, at step S530, a memory capacity influencing the calculation capacity or the calculation speed is inputted and at step S540, remaining capacity of a hard disc to which data is formed is inputted.

Further, at step S550, a table in correspondence with a system that is previously set in accordance with the combinations, is referred to and the most pertinent number of lattice points is read. When the number of lattice points is provided, a processing of increasing lattice points is performed at step S560. As a general tendency, the number of lattice points stored to the table in correspondence with a system, may be set such that the lattice interval is increased when the calculation capacity or the calculation speed is large and the lattice interval is decreased when the remaining capacity of a hard disc is large. Naturally, the input elements in the constitution of instruments are not limited to those in the above-described example and weights thereof are not constant. For example, when the remaining capacity of a hard disc is large, a table of full size can be formed although a balance in respect of cache must be taken into consideration.

In this case, an inquiry in respect of whether an object of printing as an environment of use by a user, is provided with much data of a bit map system such as photograph or much data of a draw data system may be conducted between step S540 and step S550. Further, if there is much data of a bit map system, the number of lattice points may be increased by assuming an environment where emphasis is put on color reproducing performance as in photograph and when there is much data of a draw data system, the number of lattice points may be decreased by assuming an environment where the color reproducing performance is not so important such as in a business graph.

Although the processing of increasing lattice points is performed in the installing operation by which the color conversion table 21b2b is formed, the color conversion table 21b2b having a size necessary in printing may be formed on RAM of the computer 21. The merit in storing the small pre conversion color conversion table 21b2c normally in a hard disc and forming the color conversion table 21b2b having a size necessary for executing printing on RAM which can be accessed at high speed, is enormous. Naturally, also in this case, similar to the case of a hard disc, the lattice interval may be set and the size to be spread may be determined in consideration of the remaining capacity of RAM that can be utilized.

As shown by FIG. 3, when the application 21d prints, the printer driver 21b is started via the operating system 21a and in this case, the file type is furnished to the printer driver 21b. The printer driver 21b determines whether the object of printing is of a bit map system or a draw data system from the file type in this case (for example, bmp or the like) and forms color conversion table 21b2b by setting the number of lattice points corresponding thereto. The magnitude of a number of lattice points may be set in accordance with a tendency similar to that in the case where the above-described installer is used. Naturally, the method of determining kind of input data is not limited to such a file type but the kind of data may be determined in accordance with whether a number of colors of actually inputted data is large or small, or the like, or the operating system may determine the kind of object and may inform it to the printer driver.

In this way, when the installer operation is executed by the computer 21 constituting the image processing device 20, at step S130, the color conversion table 21b2b is formed from the pre conversion color conversion table 21b2c. In the processing of increasing lattice points in this case, lattice points are increased by nonlinear interpolation calculation utilizing the Lagrange interpolation equation at step S430 or the lattice points are increased by linear interpolation, or the like. Further, in that case the number of lattice points may be fixed or the number of lattice points may be changed in accordance with environment or inputted image. Thereby, the color conversion table 21b2b having a pertinent size can be formed from the pre conversion color conversion table 21b2c having a small size.

We claim:

1. A method of producing a color conversion table adapted to be used in a printing operation for converting data from a grey scale color space to print data of a different color space, comprising:
detecting a reference to said color conversion table as part of a printing operation;
in response to said reference of said color conversion table:
accessing, on a non-volatile storage of a computer system, a predetermined pre-conversion table having a first number of lattice points and being adapted to convert data from said grey scale color space to said different color space using a correspondence relationship; and
using said computer to add a number of additional lattice points to said pre-conversion table to produce said color conversion table in a RAM storage region of said computer, wherein a total number of lattice points in said color conversion table is greater than said pre-conversion table but less than a number of lattices corresponding to a number of gradations of each color, and wherein said color conversion table provides overall coverage for said different color space; and
using said color conversion table for said printing operation.

2. The method of producing a color conversion table as set forth in claim 1, wherein said number of additional lattice points is based on storage constraints of an environment of said computer.

3. The method of producing a color conversion table as set forth in claim 1, wherein all of said lattice points of said color conversion table are at uniform intervals.

4. The method of producing a color conversion table as set forth in claim 1, wherein said number of additional lattice points is based on a user input.

5. The method of producing a color conversion table as set forth in claim 1, wherein said number of additional lattice points is based on a size of available space of said RAM storage region.

6. The method of producing a color conversion table as set forth in claim 1, wherein said number of additional lattice points is based on a value representing the kind of a converted image.

7. A computer program product for creating a color conversion table adapted to be used in a printing operation for converting data from a grey scale color space to print data of a different color space, comprising:
computer readable instructions, and
a non-volatile computer readable medium bearing said instructions;
wherein said instructions enable a computer system to perform the steps of:
detecting a reference to said color conversion table as part of a printing operation;
in response to said reference of said color conversion table:
accessing, on a non-volatile storage of said computer system, a predetermined pre-conversion table having a first number of lattice points and being adapted to convert data from said grey scale color space to said different color space using a correspondence relationship;
adding a number of additional lattice points to said pre-conversion table to produce said color conversion table in a RAM storage region of said computer, wherein a total number of lattice points in said color conversion table is greater than said pre-conversion table but less than a number of lattices corresponding to a number of gradations of each color, and wherein said color conversion table provides overall coverage for said different color space; and
using said color conversion table for said printing operation.

8. The computer program product as set forth in claim 7, wherein said number of additional lattice points is based on storage constraints of an environment of said computer system.

9. The computer program product as set forth in claim 7, wherein all of said lattice points of said color conversion table are at uniform intervals.

10. The computer program product as set forth in claim 7, wherein said number of additional lattice points is based on a user input.

11. The computer program product as set forth in claim 7, wherein said number of additional lattice points is based on a size of available space of said RAM storage region.

12. The computer program product as set forth in claim 7, wherein said number of additional lattice points is based on a value representing the kind of a converted image.

13. A computer system having a memory under control of a processor, the memory having computer readable instructions for creating a color conversion table adapted to be used in a printing operation for converting data from a grey scale color space to print data of a different color space, the computer readable instructions being adapted to enable said computer system to perform the steps of:

detecting a reference to said color conversion table as part of a printing operation;

accessing, on a non-volatile storage of said computer system, a predetermined pre-conversion table having a first number of lattice points and being adapted to convert data from said grey scale color space to said different color space using a correspondence relationship; and in response to said reference of said color conversion table:

using said computer to add a number of additional lattice points to said pre-conversion table to produce said color conversion table in a RAM storage region of said computer, wherein a total number of lattice points in said color conversion table is greater than said pre-conversion table but less than a number of lattices corresponding to a number of gradations of each color, and wherein said color conversion table provides overall coverage for said different color space; and using said color conversion table for said printing operation.

14. The computer system as set forth in claim 13, wherein said number of additional lattice points is based on storage constraints of an environment of said computer.

15. The computer system as set forth in claim 13, wherein all of said lattice points of said color conversion table are at uniform intervals.

16. The computer system as set forth in claim 13, wherein said number of additional lattice points is based on a user input.

17. The computer system as set forth in claim 13, wherein said number of additional lattice points is based on a size of available space of said RAM storage region.

18. The computer system as set forth in claim 13, wherein said number of additional lattice points is based on a value representing the kind of a converted image.

\* \* \* \* \*